US010271242B2

(12) United States Patent
Lee et al.

(10) Patent No.: US 10,271,242 B2
(45) Date of Patent: Apr. 23, 2019

(54) METHOD AND APPARATUS FOR TRAFFIC LOAD BALANCING IN MOBILE COMMUNICATION SYSTEM

(71) Applicants: Samsung Electronics Co., Ltd., Gyeonggi-do (KR); INDUSTRY-ACADEMIC COOPERATION FOUNDATION, YONSEI UNIVERSITY, Seoul (KR)

(72) Inventors: Sanghoon Lee, Seoul (KR); Beom Kwon, Seoul (KR); Seonghyun Kim, Seoul (KR); Jungshin Park, Seoul (KR); Hojae Lee, Gyeonggi-do (KR)

(73) Assignees: Samsung Electronics Co., Ltd (KR); Industry-Academic Cooperation Foundation, Yonsei University (KR)

( * ) Notice: Subject to any disclaimer, the term of this patent is extended or adjusted under 35 U.S.C. 154(b) by 162 days.

(21) Appl. No.: 14/486,422

(22) Filed: Sep. 15, 2014

(65) Prior Publication Data
US 2015/0078168 A1 Mar. 19, 2015

(30) Foreign Application Priority Data

Sep. 13, 2013 (KR) ........................ 10-2013-0110569

(51) Int. Cl.
*H04W 28/08* (2009.01)
*H04W 24/02* (2009.01)
*H04W 88/08* (2009.01)

(52) U.S. Cl.
CPC .......... *H04W 28/08* (2013.01); *H04W 24/02* (2013.01); *H04W 88/08* (2013.01)

(58) Field of Classification Search
CPC . H04W 28/08; H04W 72/04; H04W 72/0486; H04W 24/04; H04W 24/02; H04W 88/08; H04W 88/02; H04W 12/06; H04W 36/12; H04W 36/30; H04W 36/00; H04W 36/22; H04W 36/04; H04W 76/06; H04W 52/02; H04W 52/0203; H04W 52/0274; H04W 52/0258; H04W 4/00; H04W 8/12; H04W 8/06; H04W 84/04; H04W 16/18
(Continued)

(56) References Cited

U.S. PATENT DOCUMENTS

| 2003/0099258 A1* | 5/2003 | Calcev ................ H04W 52/325 370/479 |
| 2010/0214943 A1* | 8/2010 | Immendorf ........... H04W 24/00 370/252 |
| 2011/0002297 A1* | 1/2011 | Jain ........................ H04L 12/66 370/331 |

(Continued)

FOREIGN PATENT DOCUMENTS

KR 1020110011145 2/2011

*Primary Examiner* — Andrew W Chriss
*Assistant Examiner* — Rasha K Fayed
(74) *Attorney, Agent, or Firm* — The Farrell Law Firm, P.C.

(57) ABSTRACT

A load distribution method and apparatus of a base station are disclosed. The method includes measuring load information associated with the BS; transmitting the measured load information to at least one adjacent BS; receiving load information from the at least one adjacent BS; generating a first cluster including the BS and the at least one adjacent BS; and executing a load distribution operation with respect to the first cluster, wherein at least one BS included in the first cluster is included in a second cluster.

20 Claims, 16 Drawing Sheets

(58) Field of Classification Search
USPC ....... 370/235, 311, 338, 332, 280, 252, 329,
370/389, 395.1; 709/208, 223, 226;
455/453, 436, 432.1, 437, 574, 423, 561,
455/438, 442, 466, 426.2, 448
See application file for complete search history.

(56) References Cited

U.S. PATENT DOCUMENTS

| | | | | |
|---|---|---|---|---|
| 2011/0028181 A1* | 2/2011 | Byun | ................ | H04W 36/0085 455/525 |
| 2011/0130137 A1* | 6/2011 | Sanders | ................ | H01Q 1/246 455/424 |
| 2011/0171952 A1* | 7/2011 | Niu | ................ | H04L 43/0882 455/422.1 |
| 2011/0281585 A1* | 11/2011 | Kwon | ................ | H04L 1/0002 455/436 |
| 2011/0294527 A1* | 12/2011 | Brueck | ................ | H04W 24/02 455/466 |
| 2012/0307697 A1* | 12/2012 | Mukhopadhyay | .... | H04W 24/02 370/311 |
| 2013/0130670 A1* | 5/2013 | Samdanis | ............. | H04W 24/02 455/418 |
| 2013/0183976 A1* | 7/2013 | Zhuang | ................ | H04W 48/20 455/436 |
| 2013/0230014 A1* | 9/2013 | Kitaji | .................... | H04W 28/08 370/329 |
| 2013/0244682 A1* | 9/2013 | Schoenerstedt | ....... | H04W 24/00 455/452.1 |
| 2013/0272170 A1* | 10/2013 | Chatterjee | ............. | H04W 28/02 370/280 |
| 2013/0301423 A1* | 11/2013 | Sirotkin | .................. | H04W 4/90 370/241.1 |
| 2013/0303167 A1* | 11/2013 | Zhu | ........................ | H04W 4/90 455/436 |
| 2014/0004862 A1* | 1/2014 | Ekemark | ............... | H04W 72/06 455/443 |
| 2014/0198659 A1* | 7/2014 | Vargas Bautista | .... | H04W 28/08 370/236 |
| 2015/0087325 A1* | 3/2015 | Nuss | ...................... | H04W 28/08 455/453 |
| 2015/0364780 A1* | 12/2015 | Libis | ................. | H01M 8/04955 429/418 |

* cited by examiner

METHOD AND APPARATUS FOR TRAFFIC LOAD BALANCING IN MOBILE COMMUNICATION SYSTEM

PRIORITY

This application claims priority under 35 U.S.C. § 119(a) to Korean Patent Application No. 10-2013-0110569 filed on Sep. 13, 2013 in the Korean Intellectual Property Office, the entire disclosure of which is incorporated herein by reference.

BACKGROUND OF THE INVENTION

1. Field of the Invention

The present invention relates generally to an inter-cell load balancing in a mobile communication system and, more particularly, to a method and apparatus for distributing traffic of a base station through the exchange of load information with an adjacent base station.

2. Description of the Related Art

From the early stage of providing voice-oriented services, mobile communication systems have evolved into high-speed and high-quality wireless packet data communication systems which provide data and multimedia services. Various mobile communication standards, such as High Speed Downlink Packet Access (HSDPA) and High Speed Uplink Packet Access (HSUPA), Long Term Evolution (LTE), Long Term Evolution-Advanced (LTE-A), High Rate Packet Data (HRPD) of the $3^{rd}$ Generation Partnership Project-2 (3GPP2), and IEEE 802.16, have recently been developed to support high-speed and high-quality wireless packet data communication services. In particular, the LTE system, which is a system developed to efficiently support high speed wireless packet data transmission, maximizes wireless system capacity by using various wireless access technologies. The LTE-A system, which is an advanced wireless system of the LTE system, has enhanced data transmission capability as compared to the LTE system.

Existing $3^{rd}$ Generation (3G) and $4^{th}$ Generation (4G) wireless packet data communication systems such as HSDPA, HSUPA, HRPD, and LTE/LTE-A employ an Adaptive Modulation and Coding (AMC) scheme, a channel-sensitive scheduling scheme, and the like to improve transmission efficiency. In the AMC scheme, a transmitter may adjust the amount of transmission data according to the channel state. For example, when the channel state is poor, the transmitter may adjust the reception error probability to a desired level by reducing the amount of transmission data, and when the channel state is good, the transmitter may adjust the reception error probability to a desired level by increasing the amount of transmission data, thereby efficiently transmitting a large amount of information.

To improve communication efficiency, methods of managing the load of a cell that a terminal accesses and managing the channel state are being developed. The general clustering technology for the management of the load of a cell is shown in FIG. 1. The general clustering technology forms a static cluster based on a Center Base Station (Center BS) which is a cluster header, as shown in FIG. 1. Internal information of the cluster may be collected in the Center BS through an X2-interface between Base Stations (BSs). The Center BS manages each cluster based on the information through a centralized scheme. In this instance, each cluster is independent and thus, managing the cooperation between the clusters is difficult when executing additional engineering designs or cooperation. In addition, due to a varying channel and interference environment, reforming a cluster may be difficult. Therefore, a technology for dynamically managing a cluster is needed.

SUMMARY OF THE INVENTION

The present invention has been made to address at least the above problems and/or disadvantages and to provide at least the advantages described below. Accordingly, an aspect of the present invention is to provide an improved an inter-cell load balancing method and apparatus. Another aspect of the present invention provides an inter-cell load balancing method and apparatus using a dynamic load balancing scheme.

An aspect of the present invention provides an improved inter-cell load balancing method and apparatus. According to another aspect of the present invention, a load balancing operation may be executed among a plurality of cells using a dynamic load balancing scheme.

According to an aspect of the present invention, in comparison with a conventional centralized load management method, embodiments of the present invention readily executes a load balancing operation by exchanging load information with another cluster or another group. Also, embodiments of the present invention may reduce the load of a center Base State (BS) that controls the centralized load management.

According to another aspect of the present invention, load balancing may be effectively executed in a cluster border.

In addition, according to another aspect of the present invention, the imbalance of the inter-cell traffic may be removed through the exchange of information, with low complexity, and the fairness and balance of traffic of the whole system may be secured as opposed to a single cell and thus, the minimum Quality of Service (QoS) of the whole system may be secured reliably.

In addition, according to another aspect of the present invention, a dynamic load balancing technology is provided that does not affect a traffic service of an existing system, through the overlay clustering.

According to one aspect of the present invention, a method for load distribution of a base station (BS) is provided, including measuring load information associated with the BS; transmitting the measured load information to at least one adjacent BS; receiving load information from the at least one adjacent BS; generating a first cluster including the BS and the at least one adjacent BS; and executing a load distribution operation with respect to the first cluster, wherein at least one BS included in the first cluster is included in a second cluster.

According to another aspect of the present invention, a base station (BS) that performs load distribution with any adjacent BSs includes a transceiving unit that performs data communication with an adjacent BS; and a load distribution controller that controls the measurement of load information associated with the BS, controls transmission of the measured load information to the adjacent BS and reception of load information of the adjacent BS through the transceiving unit, controls the generation of a first cluster including the BS and the adjacent BS, and controls the execution of a load distribution operation with respect to the first cluster, wherein the at least one BS included in the first cluster is included in a second cluster.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EMBODIMENTS OF THE PRESENT INVENTION

Figure 1:
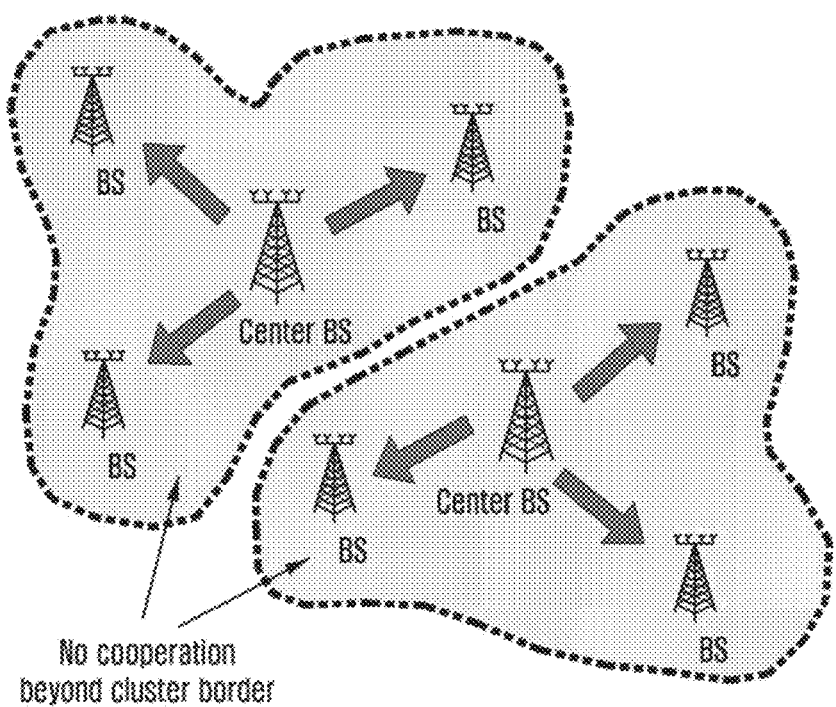
FIG. 1 is a diagram illustrating a conventional centralized load management method.

Hereinafter, embodiments of the present invention will be described in more detail with reference to the accompanying drawings so as to allow those skilled in the art to easily implement the present invention. However, the present invention may be implemented in various different forms and is not limited to the embodiments described herein. Detailed descriptions of constructions or processes known in the art may be omitted to avoid obscuring the subject matter of the present invention. The same or similar components may be designated by the same or similar reference numerals although they are illustrated in different drawings.

Existing static clustering-based load balancing technology has difficulty in executing load balancing in a cluster border and the centralized-based load balancing technology has the burden of exchanging a great amount of cell information of a plurality of cells, and needs to execute calculations of high complexity to determine the load balancing at one time.

Therefore, an embodiment of the present invention provides a dynamic clustering-based load balancing method and apparatus.

Figure 2:
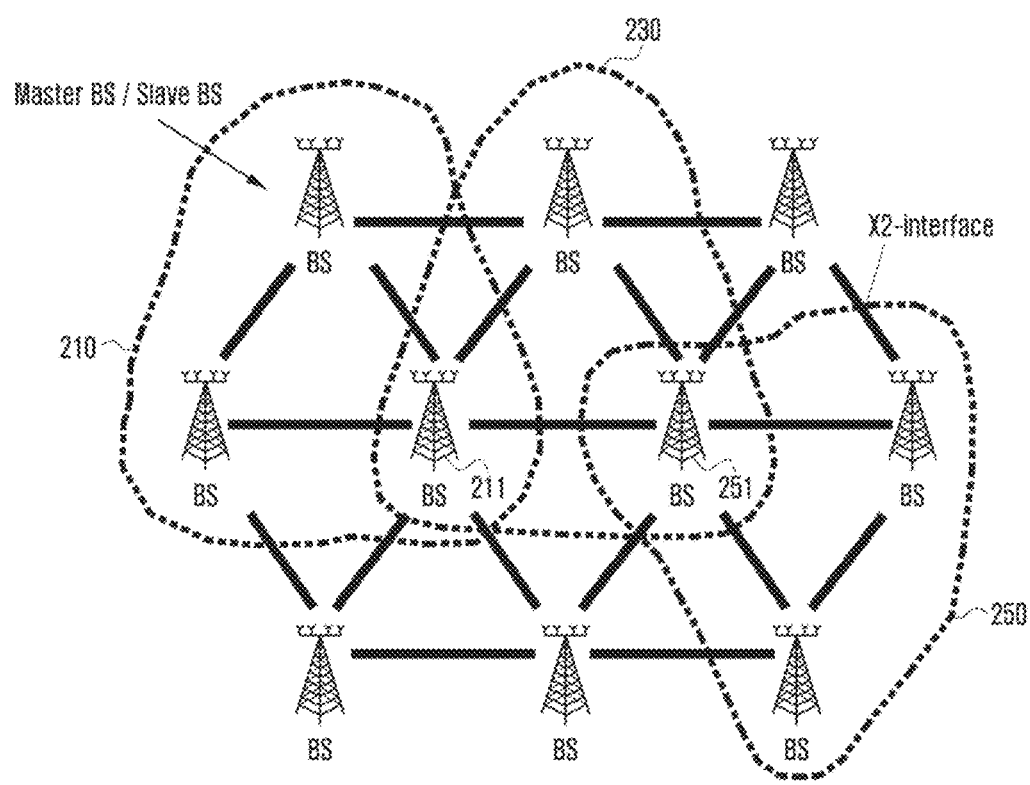
FIG. 2 is a diagram illustrating a dynamic overlay clustering structure according to an embodiment of the present invention.

FIG. 2 is a diagram illustrating a dynamic overlay clustering structure according to an embodiment of the present invention.

Referring to FIG. 2, a plurality of cells exist in a mobile communication system environment. Each cell is based on a base station, and the term "cell" may also refer to the service coverage of the base station. Hereinafter, the terms 'base station' and 'cell' are used interchangeably.

Each User Equipment (UE) communicates with a single Base Station (BS), but may receive interference from other BSs. Each BS exchanges load information with other BSs through an X2-interface. The BSs in FIG. 2 form three clusters 210, 230, and 250. Each BS operates as either a master BS or a slave BS in a single cluster, but a BS may be a master BS in one cluster and a slave BS in another cluster. For example, a BS 211 is a master BS in a cluster 210, but is a slave BS in a cluster 230. A BS 251 is a master BS in the cluster 230, and a slave BS in the cluster 250.

According to an embodiment of the present invention, whether a BS is a master BS or a slave BS is determined based on load information exchanged with an adjacent BS. For example, a BS that has a load lower than an adjacent cell may operate as a slave BS with respect to the BS that has a higher load. A BS that has a load higher than an adjacent cell may operate as a master BS with respect to the BS having a lower load.

Referring to FIG. 2, each BS compares its load with the loads of six adjacent BSs, and may operate as a master in a cluster and may operate as a slave in another cluster. In this instance, as illustrated in FIG. 2, each cluster has overlay clustering, and a master-slave subordinate relationship is defined for each cell, based on inter-cell load information. The load information exchanged between cells may be defined as shown in Equations (1) and (2). The load information defined through Equation (1) and Equation (2) is merely an example, and methods of calculating load information in the present invention are not limited thereto.

$$\text{Load} = \frac{1}{\text{Rate}_u} \quad \text{Equation (1)}$$

$$\text{Rate}_u = \sum_i \text{Rate}_i / |U|, \, u \in U \quad \text{Equation (2)}$$

$\text{Rate}_u$ is the value obtained by dividing a total rate $\text{Rate}_i$ of each cell by a total number U of users, and may be defined as an average rate of a cell.

Load information in Equation (1) is expressed by the inverse of the rate per user among the users to which the BS provides service. Therefore, as the number of users increases, the load becomes high, and as the number of user decreases, the load becomes low. In addition, when the channel state of the users is poor, the load also becomes high.

Figure 3:
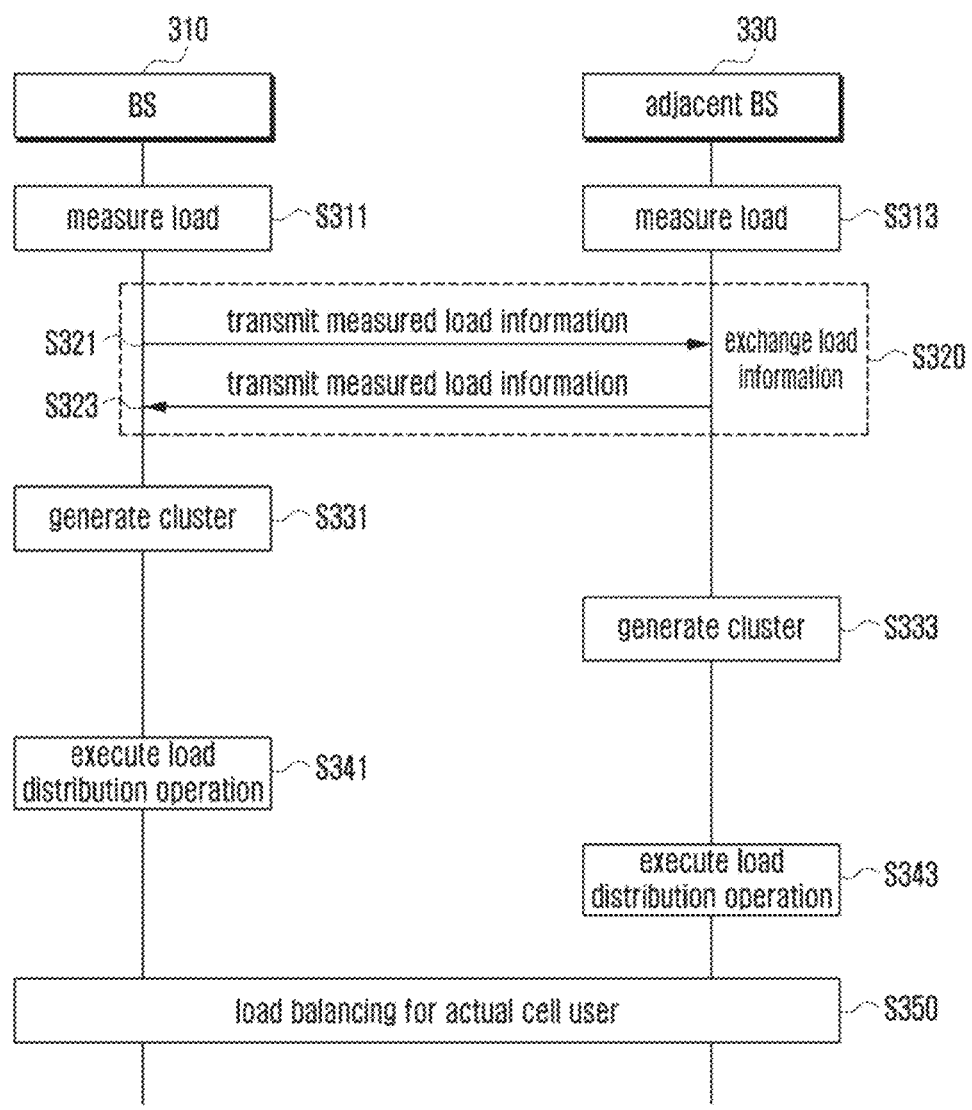
FIG. 3 is a flowchart illustrating an inter-cell load balancing method executed between a Base Station (BS) and an adjacent BS according to an embodiment of the present invention.

FIG. 3 is a flowchart illustrating an inter-cell load balancing method executed between a BS and an adjacent BS.

Referring to FIG. 3, a BS 310 measures its own load 1 in step S311 while an adjacent BS 330 measures its own load in step S313. The adjacent BS 330 is an adjacent BS from the perspective of BS 310, and the BS 310 may be an adjacent BS from the perspective of BS 330. In addition, although only a single relationship between BSs is illustrated in FIG. 3, the BS 310 may have a plurality of adjacent BSs, and FIG. 3 exemplifies the adjacent BS 330 for ease of description.

In step S320, the BS 310 and the adjacent BS 330 exchange their measured load information. The BSs may exchange the load information through, for example, an X2-interface between BSs. The BS 310 transmits its measured load information to the adjacent BS 330 in step S321, and the adjacent BS 330 transmits its measured load information to the BS 310 in step S323. Each BS may transmit its load information through a broadcasting method.

Each BS that exchanges load information may form a part of a cluster including the BS itself. In each cluster, a subordinate relationships, i.e., whether a BS is a master or a slave, are determined based on the exchanged load information. A BS may be a master BS in one cluster, and may be a slave BS in another cluster.

In step S331, the BS 310 generates a cluster as described in the above descriptions. In step S333, the adjacent BS 330 generates a cluster in a similar manner.

After a cluster is generated with respect to a cell, a load distribution operation is executed in each cluster. The load distribution operation of each cluster is executed starting from the cluster having the higher priority.

In FIG. 3, the priority of the cluster including BS 310 is higher than the priority of the cluster including the adjacent BS 330, so the load distribution operation is executed first with respect to the cluster including BS 310 in step S341. Subsequently, the load distribution operation is executed with respect to the cluster including the adjacent BS 330 according to its lower priority in step S343.

In the same manner, the load distribution operation may be executed with respect to other clusters including other adjacent BSs.

When it is determined that the load distribution operation is completed with respect to all of the clusters, a load distribution operation with respect to each user to which each cell actually provides service is executed in all of the cells included in each cluster in step S350. In this example, the load balancing operation with respect to each user is simultaneously executed in all of the cells.

Figure 4:
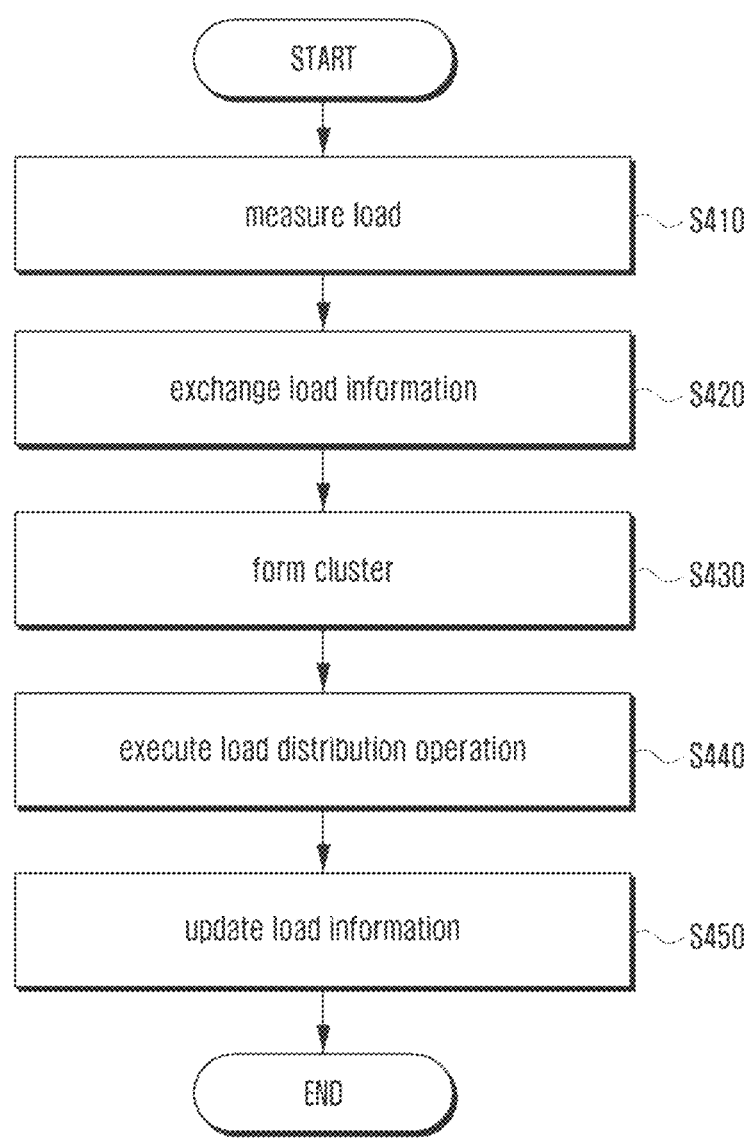
FIG. 4 is a diagram illustrating a method of executing an overlay clustering operation in an inter-cell load balancing method according to an embodiment of the present invention.

FIG. 4 is a flowchart illustrating a load distribution operation of a BS according to an embodiment of the present invention.

In step S410, a BS measures its own load.

In step S420, the BS exchanges measured load information with at least one adjacent BS. The BSs may transmit and receive the load information through an X2-interface.

In step S430, the BS forms a cluster including the BS itself and at least one adjacent BS.

In forming the cluster, the BS determines a subordinate relationship between the BS and any adjacent BSs based on the load information exchanged with the adjacent BSs. In particular, the BS compares the load information exchanged between the BS and the adjacent BS, and sets the BS as a master BS when the load of the BS is higher than the load of the adjacent BS, and sets the BS as a slave BS when the load of the BS is lower than the load of the adjacent BS.

The subordinate relationships are determined for each BS, and then the subordinate relationships are set for each cluster. By comparing the load information among BSs included in each of the generated clusters, the priority of a cluster including a cell having a higher load is set to be higher than the priority of a cluster including a cell having a lower load.

Subsequently, the BS executes a load distribution operation with respect to the cluster including the BS itself in step S440.

When the BS is a master BS in the cluster including the BS itself, the BS may distribute its load with an adjacent slave BS by transmitting a load distribution command. When the BS is not a master BS, the BS may receive a load distribution command from a master BS of the corresponding cluster, and execute a load distribution operation.

When the BS is a master BS, the BS sets a target load range, transmits user information that is beyond the target load range to a slave BS, receives, from the slave BS, a response to the transmitted user information, and executes the load distribution operation based on the received response.

When each cluster executes a load distribution operation, the load distribution operation is executed starting from the cluster having a higher priority based on a priority set for each cluster in step S440.

In step S450, the BS updates load information with new load information based on a result of the load distribution operation.

When the BS operates as a master BS while executing the load distribution operation of step S440, the load distribution operation of the BS is terminated after updating. When the BS is not a master BS while executing the load distribution operation, the BS forms a cluster again based on a result of updating, and repeats a process of executing a load distribution operation with respect to the newly formed cluster.

Subsequently, when the load distribution operation is completely executed with respect to all of the clusters, the BS executes a load distribution operation with respect to each user to which each cell actually provides service with respect to all of the cells.

Figure 5:
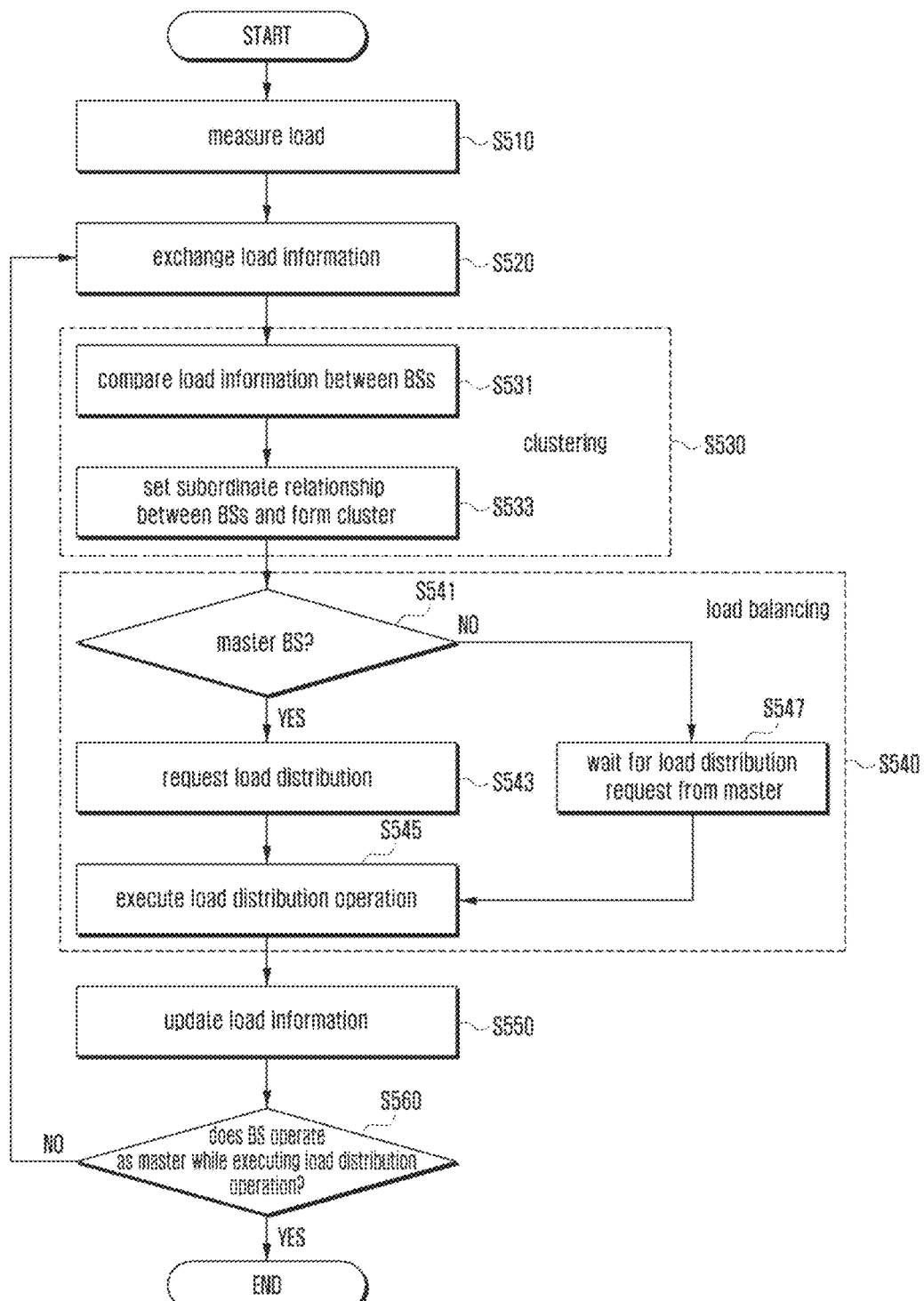
FIG. 5 is a flowchart illustrating an overlay-clustering based load distribution method of a BS according to an embodiment of the present invention.

FIG. 5 is a flowchart illustrating an overlay-clustering based load distribution method of a BS according to an embodiment of the present invention.

The flow in FIG. 5 is repeatedly executed in each cell through a cycle predetermined based on a system environment.

In step S510, a BS measures its own load while adjacent BSs of the system measure their own loads. Subsequently, in step S520, the BS exchanges load information with any adjacent BSs. The BS and an adjacent BS may exchange load information through an X2-interface.

In step S530, the BS executes clustering, by including at least one adjacent BS. In particular, in step S531, each BS compares its own load information with the load value received from an adjacent BS. In step S533, each BS sets itself as a slave BS when the load of the adjacent BS is higher than its own load, or sets itself as a master BS when the load of the adjacent BS is lower than its own load. Through the above, each BS sets subordinate relationships with any adjacent BS. In addition, the BSs form clusters using their respective subordinate relationship, where those clusters may overlay one another. The load information of BSs of each cluster are compared with respect to the clusters that overlay one another, and the priority of a cluster including a cell having a higher load is set higher.

Subsequently, in step S540, each BS and each cluster execute load balancing.

In particular, in step S541, each BS determines whether it is a master BS or a slave BS in its cluster, based on the set subordinate relationships.

If the BS determines it is a master BS in step S541, it requests a load distribution operation from at least one BS in step S543. Each BS may request at least one adjacent BS included in the cluster to execute a load distribution operation.

In step S545, a master BS that requests at least one load distribution operation and any BS that receives a request for a load distribution operation execute a load distribution operation. The load distribution operation is executed starting from a cluster having a higher priority. A BS having a higher load is a master BS and thus, a load of the master BS may be distributed to an adjacent slave BS.

A master BS also sets a target load range. The master BS may determine that a user is beyond the target load range, and transmit the information concerning the same to a slave BS. The master BS receives a response to the transmitted user information from the slave BS and executes a load distribution operation based on the received response.

If the BS determines that it is not the master BS in step S541, the BS waits for a load distribution request from the master BS in step S547. After the load distribution request is received from the master BS in step S547, load distribution operations are executed in step S545.

In step S550, the BS updates load information.

In step S560, the BS determines whether the BS operates as a master BS or a slave BS while executing load distribution operations.

If the BS determines it operates as a master BS while executing the load distribution operations in step S560, it may not proceed with another operation, and terminates load distribution operations. However, if the BS determines it operates as a slave BS in step S560, it continues to execute load distribution operations as discussed below.

That is, if it is determined that the BS is not a master BS, the method loops back to step S520 so that the BS exchanges updated load information, proceeds in step S530 to form a cluster based on the results of updating, and proceeds in step S540 to execute a load distribution operation with respect to the newly formed cluster.

When a master BS executes a load distribution operation with respect to all of the clusters in this manner, the procedure with respect to all of the clusters is terminated, and a load distribution operation with respect to each user to which each cell actually provides service is executed with respect to all of the cells.

Hereinafter, each operation of FIG. 5 will be described in detail with reference to FIGS. 6 through 13.

Figure 6:
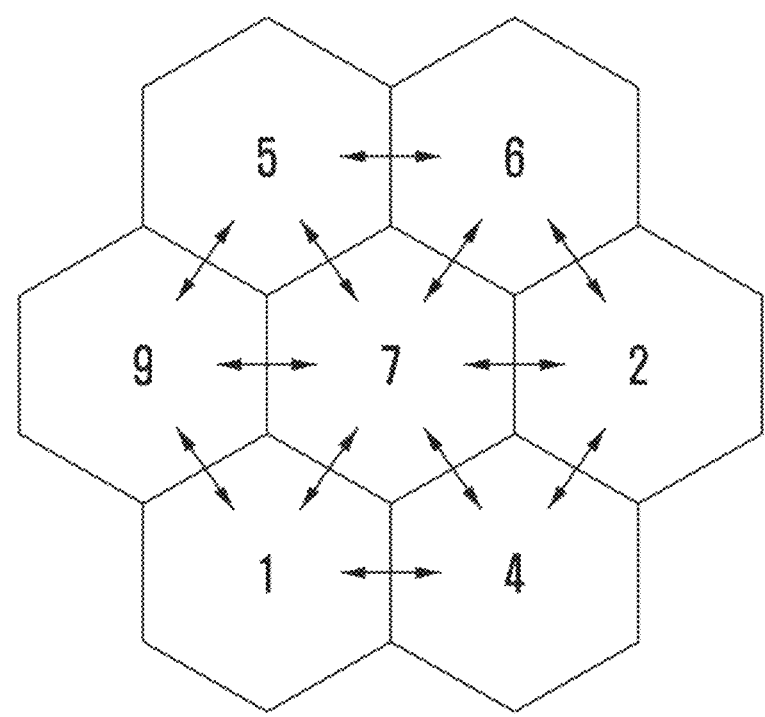
FIG. 6 is a diagram illustrating a load information exchanging operation in a load distribution method of a BS according to an embodiment of the present invention.

FIG. 6 is a diagram illustrating a load information exchanging operation in a load distribution method of a BS according to an embodiment of the present invention. The system of FIG. 6 is configured as a 1-tier network, and each of the 7 cells corresponds to a service coverage of a BS. Numeric information expressed in a cell indicates current load information of each cell. Each cell measures its own load. Any load metric, such as that shown in Equations (1) and (2), may be used for measuring the load. Each arrow in FIG. 6 indicates the exchange of load information between adjacent BSs. The exchange of load information may be executed through an X2-intercace.

FIGS. 7A-7D are diagrams illustrating overlay clustering operations in a load distribution method according to an embodiment of the present invention.

In FIGS. 7A-7D, the 1-tier network of FIG. 6 is divided into four clusters. As described in reference to FIG. 6, each BS exchanges load information with adjacent cells. Based on the exchanged information, each BS sets subordinate relationships between BSs and subordinate relationships between clusters, as described below.

Figure 7D:
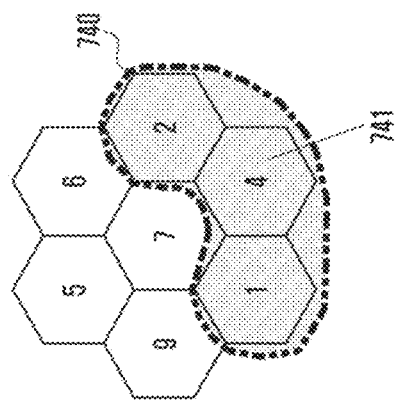
FIGS. 7A-7D are diagrams illustrating overlay clustering operations in a load distribution method according to an embodiment of the present invention.
Figure 7C:
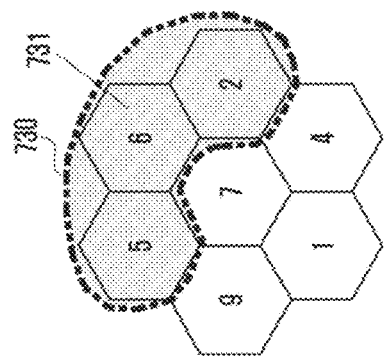
Figure 7B:
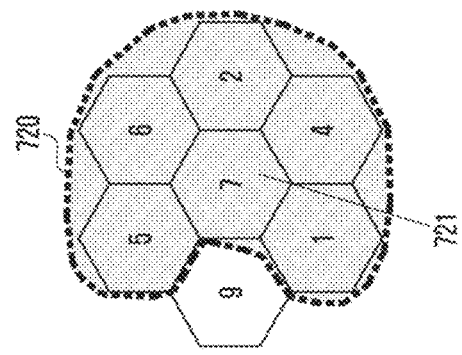
Figure 7A:
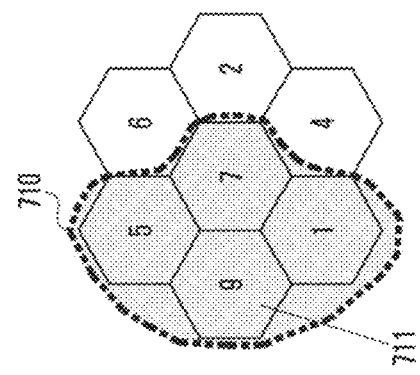

In FIG. 7A, BS 711 has the highest load (9) in the whole network and thus, the BS 711 has the highest priority, and is the master BS in a first cluster 710. Adjacent BSs having loads of 5, 7, and 1 are slave BSs to master BS 711 in the first cluster 710. The adjacent BSs having the load information of 5, 7, and 1 are thus subordinate to the master BS 711.

In FIG. 7B, a second cluster is generated, in which BS 721 is the master BS because it has the highest load in the second cluster 720 (which excludes the master BS 711 of the first cluster 710) Although the BS 721 is a slave BS with respect to the BS 711 in the first cluster 710, the BS 721 is also set as the master BS 721 in the second cluster 720. As described above, in the present invention, a BS may be both a slave BS and a master BS based on its membership in different clusters. Adjacent BSs of the master BS 721 are slave BSs in the second cluster 720 and are thus subordinate to the master BS 721. The load (7) of the master BS 721 of the second cluster 720 in FIG. 7B has a value lower than the load (9) of the master BS 711 of the first cluster 710 in FIG. 7A and thus, the second cluster 720 has a lower priority than the first cluster 710. Similarly, as discussed further below, the third cluster 730 shown in FIG. 7C has a lower priority than the second cluster 720 in FIG. 7B, and the fourth cluster 740 in FIG. 7D has a lower priority than the third cluster 730.

In FIG. 7C, the third cluster 730 is formed of a master BS 731 having the highest load (6) of the adjacent BSs in third cluster 730. Similarly to the above descriptions, although the BS 731 is a slave BS in the second cluster 720 (shown in FIG. 7B), the BS 731 is a master BS in the third cluster 730 shown in FIG. 7C. The adjacent BSs in the third cluster 730 having loads of 5 and 2 are thus subordinate to the master BS 731 in the third cluster 730.

In FIG. 7D, the fourth cluster 740 is similarly formed of a master BS 741 having the highest load (4), making the adjacent BSs, having loads of 1 and 2, subordinate to the master BS 741 in fourth cluster 740.

Each BS included in each cluster, excluding the master BSs 711, 721, 731, and 741 of the first through fourth clusters, respectively, do not have adjacent BSs having loads lower than each corresponding BS.

Accordingly, clustering may be terminated after forming the four clusters 710, 720, 730, and 740. Through the above described clustering, priorities of, and subordinate relationships between, the clusters are determined and thus, load distribution operations may be executed based on these priorities and subordinate relationships, as described below.

FIGS. 8 and 9A-9D are diagrams illustrating load distribution operations and load information updating operations in a load distribution method according to an embodiment of the present invention.

Figure 8:
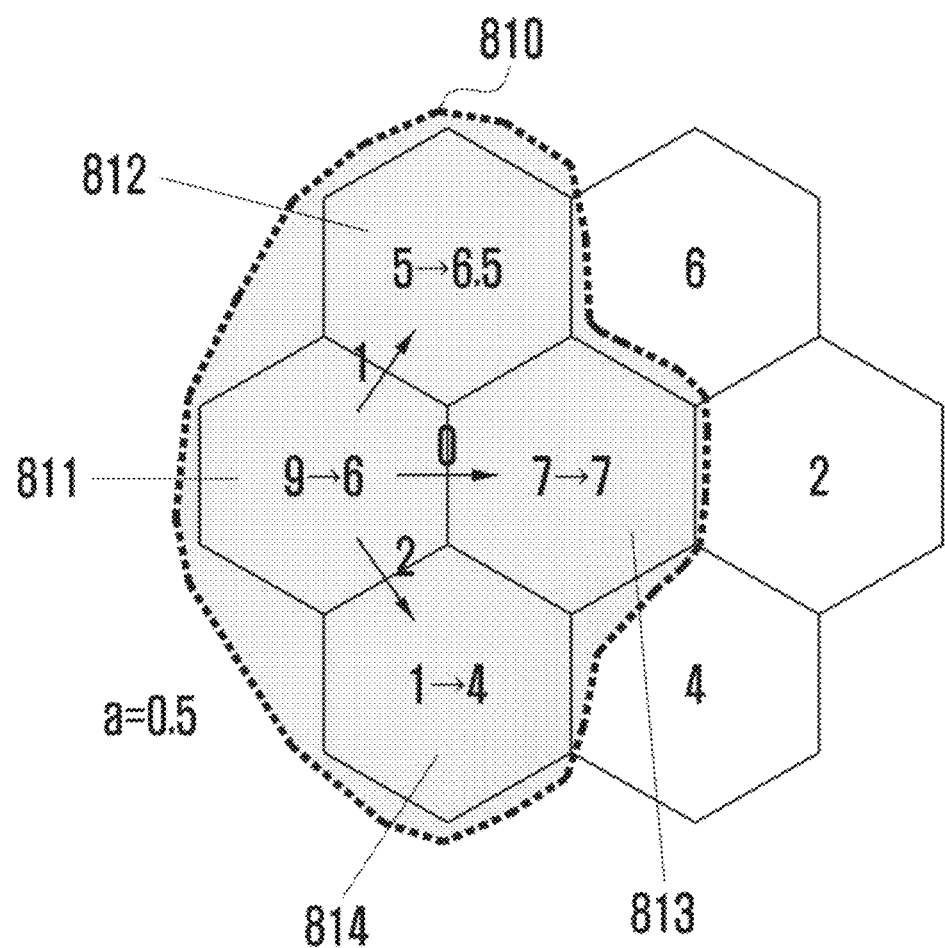
FIG. 8 is a diagram illustrating a load distribution operation and a load information updating operation in a load distribution method according to an embodiment of the present invention.

Referring to FIG. 8, a load distribution operation and a load information updating operation are executed in a first cluster 810. The first cluster 710 has the highest priority in the example of FIGS. 7A-7D and thus, a load distribution operation and a load updating operation are executed first with respect to a first cluster 810 of FIG. 8.

A master BS 811 requests load distribution from slave BSs 812, 813, and 814. As shown by the arrows in FIG. 8, master BS 811 does not distribute its load to the BS 813 having the highest load among the slave BSs (arrow labelled 0), distributes a load having a value of 1 to the BS 812 (arrow labelled 1), and distributes a load having a value of 2 to the BS 814 (arrow labelled 2). The load of the master BS 811 may be thereby reduced, while the loads of the slave BSs 812 and 814 may be thereby increased. Although only the load of the master BS 811 is transferred to the slave BSs in the above descriptions, the loads may also be exchanged between the slave BSs.

When the load distribution is executed among BSs, a load of a new user is forcibly transferred between BSs and thus, the service of the new user may be received from a farther BS. Accordingly, the channel gain may be decreased. To mitigate this problem, the load distributed to an adjacent BS may not be transferred as it is but instead a weighted value "a" is multiplied by the original value, and the result added to the original load value. In the embodiment of FIG. 8, each load value a slave BS is requested to take has been multiplied by a weighted value of 0.5 and then the result added to each load value. Thus, the load of slave BS 812 increases by 1.5 rather than 1, and the load of slave BS 814 increases by 3 rather than 2. The weighted value is not limited thereto, and may be variously set based on, e.g., the channel state in accordance with other embodiments of the present invention. For example, the weighted value may be dynamically set in consideration of a distributed load and a relationship with a BS that receives the load in another embodiment.

A BS that receives a load distribution request from two or more master BSs executes the load distribution of the higher cell and the higher cluster first, based on comparing the respective loads. Accordingly, although load distribution requests are received from a plurality of clusters and a plurality of cells, the load distribution operations are executed sequentially based on priorities and subordinate relationships set in advance.

When a BS included in a cluster executes a load distribution operation, load information associated with the cluster may be updated. In the embodiment of FIG. 8, the load value of master BS 811 is decreased (9→46) and the load values of adjacent BSs that received the load are increased (5→6.5 for slave BS 812 and 1→4 for slave BS 814), through load information updating.

FIGS. 9A through 9D are diagrams illustrating the process of repeatedly executing load distribution operations in a load distribution method according to an embodiment of the present invention.

Figure 9:
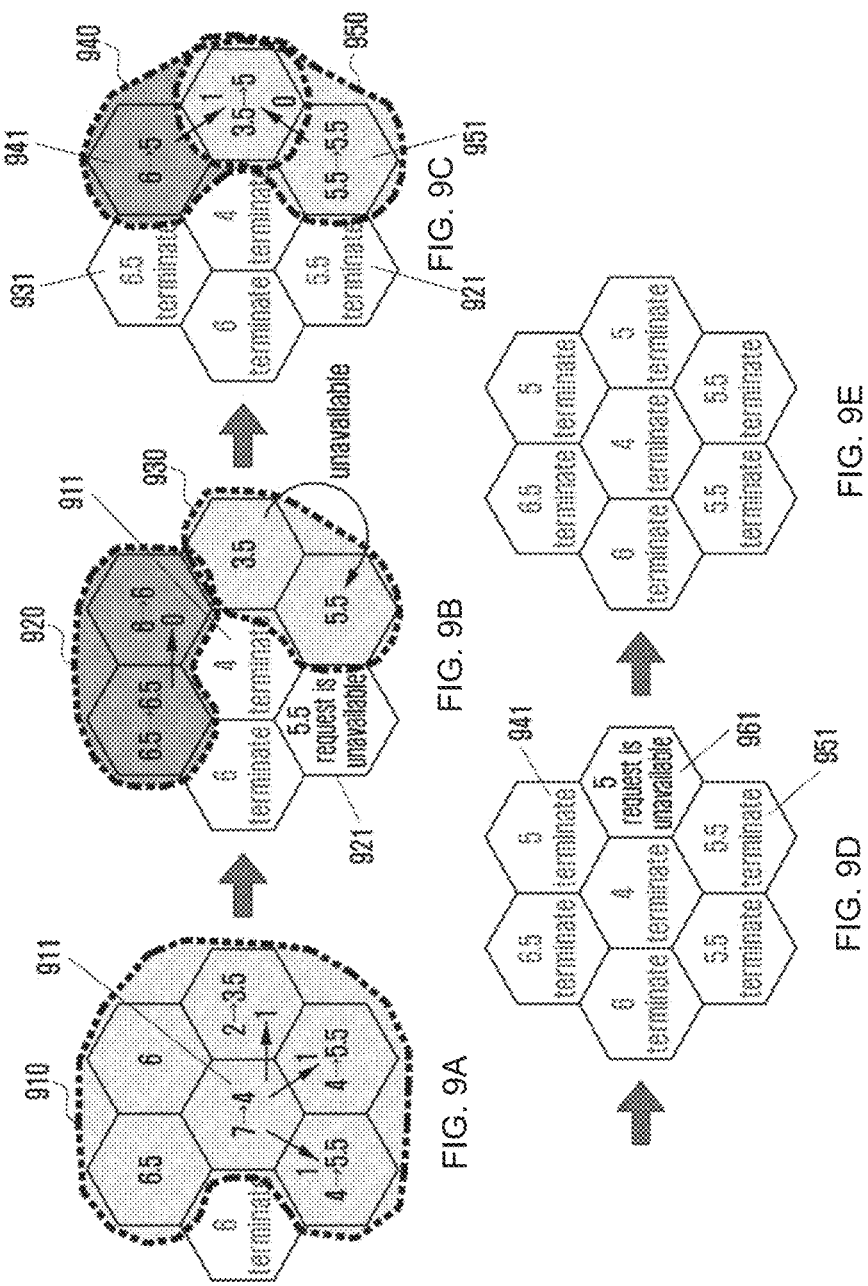
FIGS. 9A-9E are diagrams illustrating a process of repeatedly executing a load distribution operation in a load distribution method according to an embodiment of the present invention.

Referring to FIG. 9A, the master BS of which a load value was reduced from 9 to 6 in FIG. 8 has operated as a master BS and thus, may not execute the procedure any longer and thus terminates the procedure. Even using the newly updated load information, BS 911 having a load value of 7 is still the master BS of cluster 910 in FIG. 9. The master BS 911 transmits load distribution requests to adjacent BSs, and executes load distribution operations. Based on the results of the load distribution, the load information is updated in the cluster 910.

In FIG. 9B, BS 911 has executed load distribution operations as a master BS in FIG. 9A and thus, may not execute the procedure any longer and terminates the procedure. Based on the newly updated load information, new clusters 920 and 930 are formed with respect to the remaining BSs. There is no adjacent BS having a subordinate relationship to BS 921 and thus, BS 921 may not form a cluster and terminates the procedure. BS 921 may not be included in a cluster 930, because a BS may not receive a load distribution request from a master BS having the identical load value. Since the priority of the cluster 920 is higher, the cluster 930 does not execute a load distribution operation and waits until the cluster 920 executes a load distribution operation. The cluster 920 updates load information after executing load distribution operations.

In FIG. 9C, BS 931 has executed load distribution operations as a master BS in cluster 920 in FIG. 9B and thus may not execute the procedure any longer and terminates the procedure. Based on the newly updated load information, new clusters 940 and 950 are formed with respect to the remaining BSs. The priority of the cluster 940 is higher, and thus load distribution operations of master BS 941 are executed first. Subsequently, load distribution operations of master BS 951 are executed in the cluster 950.

In FIG. 9D, master BSs 941 and 951 have executed load distribution operations in FIG. 9C and thus may not execute the procedure any longer and both terminate the procedure. Using the newly updated load information, any remaining BSs may form a new cluster and may execute a load distribution operation. However, the only remaining BSis BS 961. Thus, procedures involving adjacent BSs are no longer possible and the procedure is terminated for all of the BSs as shown in FIG. 9E.

When all of the BSs complete the load distribution procedure as described above, inter-cell traffic load is distributed by distributing users to which each cell actually provides service. The procedure described above only exchanges control information between BSs, and the load distribution of an actual user is executed after completing the exchange of control information of all of the BSs. Therefore, according to an embodiment of the present invention, load distribution requests or load distribution responses may be executed in a background, without affecting the traffic loads of existing users. Subsequently, users are transferred in a group after the exchange of control information of all of the BSs and thus, the load distribution is executed without affecting an existing traffic service.

Hereinafter, an example of load distribution request, load distribution response, and user transfer will be described with reference to FIGS. 10 through 13.

Figure 10:
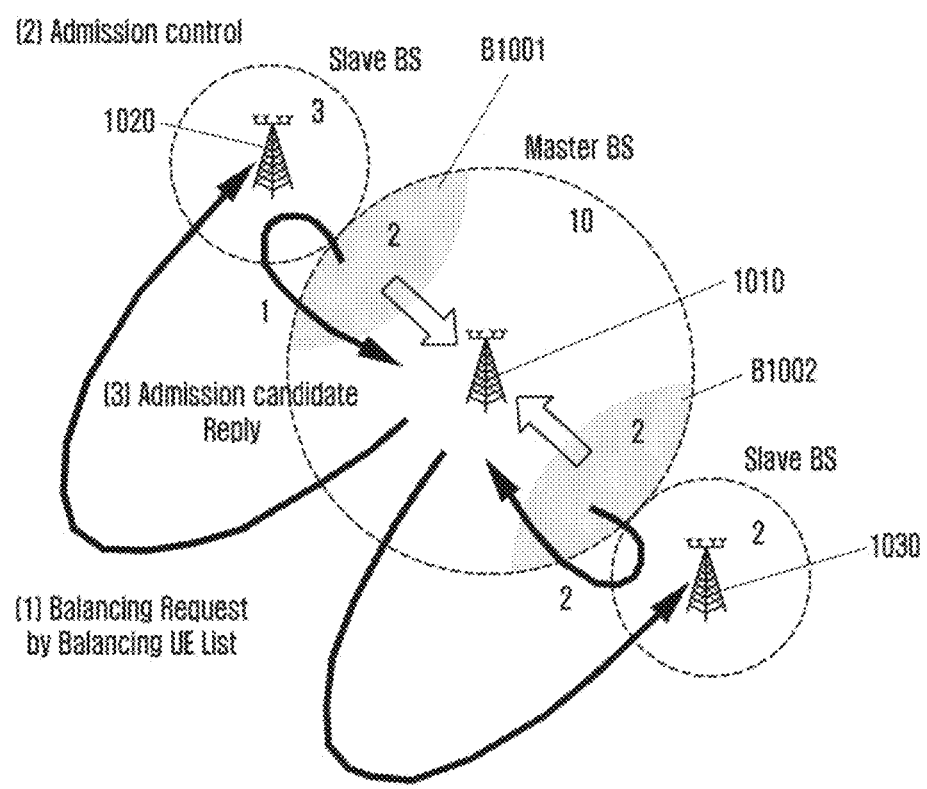
FIG. 10 is a diagram illustrating a load distribution operation in a load distribution method according to an embodiment of the present invention.
Figure 11:
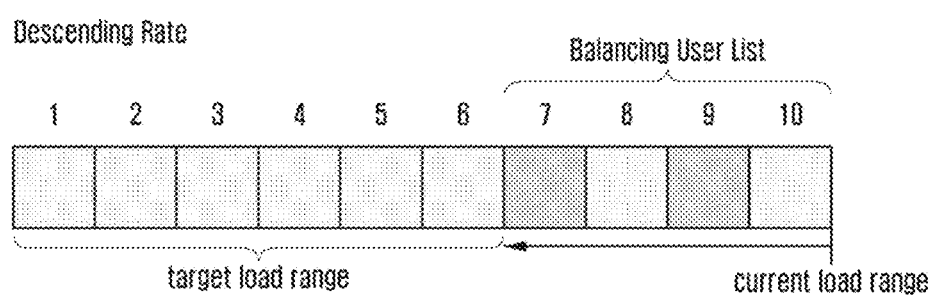
FIG. 11 is a diagram illustrating a load distribution request operation in a load distribution method according to an embodiment of the present invention.
Figure 12:
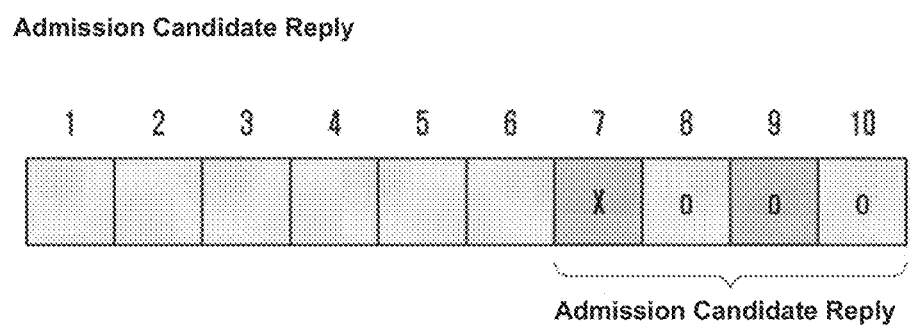
FIG. 12 is a diagram illustrating a load distribution response list in a load distribution method according to an embodiment of the present invention.
Figure 13:
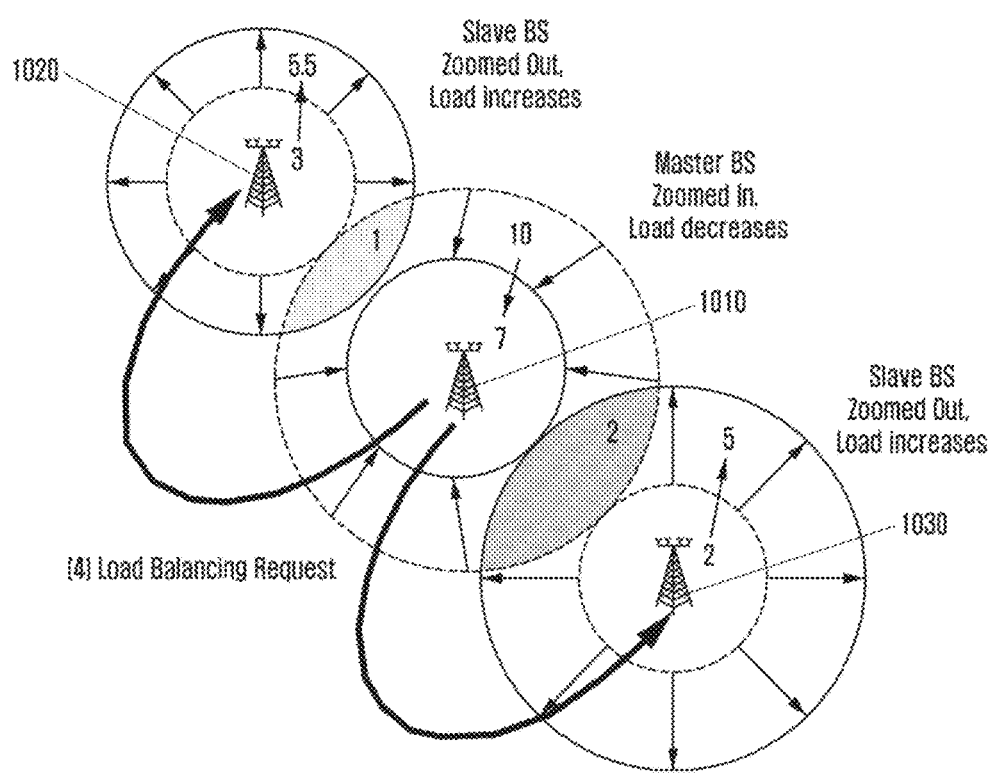
FIG. 13 is a diagram illustrating an actual user distribution operation in a load distribution method according to an embodiment of the present invention.

FIG. 10 is a diagram illustrating a load distribution operation in a load distribution method according to an embodiment of the present invention, FIG. 11 illustrates a load distribution request list according to an embodiment of the present disclosure, FIG. 12 illustrates a load response list according to an embodiment of the present invention, and FIG. 13 is a diagram illustrating an actual user distribution operation in a load distribution method according to an embodiment.

Referring to FIG. 10, a 3-cell network is shown. Based on load information, a master BS 1010 and a slave BS 1020 and 1030 are set. Methods of distributing a user to an adjacent BS through a load distribution operation include a soft handover and a hard handover.

First, the soft handover will be described. The master BS 1010 broadcasts network addresses of lower rate users to the slave BSs 1020 and 1030, so as to execute load distribution. Through the execution of the load distribution, the load of the master BS 1010 is adjusted as a load of an intermediate value of the master BS 1010 and the slave BS 1030 having the lowest load. The master BS 1010 receives Signal to Interference plus Noise Ratio (SINR) information of a user as feedback and thus, becomes aware of the rate that may be obtained during proportional fair (PF) scheduling. A list of users who need load distribution is obtained by arranging rates of the users in descending order (this is merely an example of arrangement and the arrangement methods according to the present invention are not be limited thereto). In this instance, the master BS 1010 may not be aware of an accurate location of a user and thus, may broadcast the lower rate users to all of the slave BSs 1020 and 1030.

Next, the hard handover will be described. The master BS 1010 receives the SINR information of a user as feedback, as described above, and thus becomes aware of the rate that may be obtained during PF Scheduling, and obtains the list of users who need load distribution by arranging rates of users in descending order (this is merely an example of an arrangement method and the arrangement methods according to the present invention are not be limited thereto). In this instance, the master BS 1010 receives a report about an adjacent cell of an edge user and channel state information of the adjacent cell and thus becomes aware, in advance, of a slave BS to which the master BS 1010 will transmit a request. Accordingly, the master BS 1010 transmits information regarding each user of the list of users who need to be distributed to corresponding slave BSs.

In the example shown in FIG. 10, the master BS 1010 desires to reduce its total load value of 4, so the master BS 1010 distributes a load value of 2 of B1001 to adjacent BS 1020, and distributes a load value of 2 in B1002 to adjacent BS 1030 and thus, may reduce a total load value of 4. The master BS 1010 transmit balancing request by balancing UE list (marked [1] in FIG. 10). In a case of the soft handover, the master BS may not be aware of accurate locations of a user in B1001 and a user in B1002. Therefore, the master BS transfers the user lists of users in both B1001 and B1002 to slave BSs 1020 and 1030. However, in a hard handover, the master BS is aware of a location of a user. It is effective to distribute the load of one or more users in B1001 to the slave BS 1020, and to distribute the load of one or more users in B1002 to the slave BS 1030. Accordingly, the master BS transmits the user list of the one or more users in B1001 to the slave BS 1020, and transmits the user list of the one or more users in B1002 to the slave BS 1030. The adjacent BS 1020 and 1030 perform admission control after receiving of the balancing request (marked [2] in FIG. 10). The adjacent BS 1020 and 1030 determine whether to admit load balance with the master BS 1010. The adjacent BS 1020 and 1030 transmit admission candidate reply based on the determination (marked [3] in FIG. 10).

Referring to FIG. 11, an example of a load distribution request list according to an embodiment of the present invention is shown. When a master BS of FIG. 10 desires to reduce a load value from 10 to 6, users are arranged based on their respective rates, load distribution is not executed with respect to upper rate users which correspond to the target load range, and users with lower rates which are beyond the target load range are set to be targets for load distribution.

For example, the user 7 and the user 9 in the list in FIG. 11 are users belonging to B1001, and the user 8 and the user 10 belong to B1002. In a soft handover, information related to the user 7 through 10 in the list is broadcasted to both of the slave BSs 1020 and 1030. In a hard handover, the information related to user 7 and the user 9 in the list is transmitted to the slave BS 1020, and the information related to the user 8 and user 10 in the list is transmitted to the slave BS 1030. The information transmitted to the BSs 1020 and 1030 are in a load distribution admission request (admission control) in FIG. 11.

Referring to FIG. 12, a response to the load distribution admission request of FIG. 11 is illustrated. In other words, FIG. 12 is a result of response to the load distribution admission request of the master BS 1010. FIG. 12 illustrates the case where the slave BS 1020 rejects a load distribution request associated with the user 7 and admits the load distribution request associated with the user 9, and the slave BS 1030 transmits a response that admits the load distribution request associated with the user 8 and the user 10. The result of response is determined based on the response of each of the slave BSs 1020 and 1030. The BSs 1020 and 1030 can transmit the response to the master BS 1010, and the master BS identifies the result of the response. In another embodiment of present invention, each of the BSs 1020 and 1030 can transmit the response each other. One of the slave BS 1020 or 1030 can identify the result of response and transmit the result of response to the master BS 1010.

FIG. 13 is an example of an actual result of the steps, lists, requests, and replies discussed in reference to FIGS. 10-12. The master BS 1010 transmits load balancing request to perform load balancing with the slave BSs 1020 and 1030 (marked [4] in FIG. 13). The master BS 1020 actually requests load distribution which is recalculated based on a result of a response of the slave BS 1020 and 1030. The master BS 1010 shares its load with the adjacent BSs and thus the load is decreased and the cell of master BS is zoomed in. The slave BSs 1020 and 1030 allow load distribution and thus their loads are increased and the cells of slave BSs 1020 and 1030 are zoomed out.

The method described with reference to FIGS. 10 through 13 is merely an example, and the methods for executing load distribution operations in accordance with embodiments of the present invention are not limited thereto.

Figure 14:
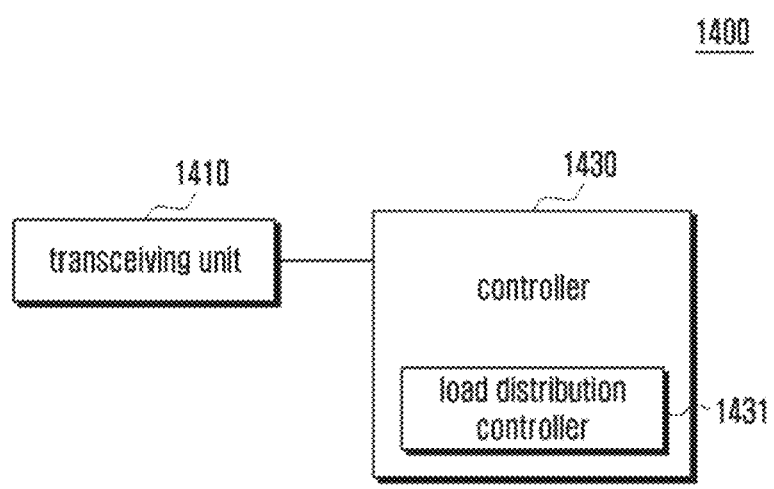
FIG. 14 is a block diagram illustrating a BS according to an embodiment of the present invention.

FIG. 14 is a block diagram illustrating a BS according to an embodiment of the present invention.

Referring to FIG. 14, a BS 1400 according to an embodiment of the present invention includes a transceiving unit 1410 that executes data communication with any adjacent BSs and any service subscribers in its cell, and a controller 1430 that controls general operations of BS 1400.

The transceiving unit 1410 has a wired interface with any adjacent BSs and a higher network entity, so as to transmit and receive data, and a wireless interface with any mobile terminal of a service subscriber in its cell, so as to transmit and receive data.

The controller 1430 according to an embodiment of the present invention further includes a load distribution controller 1431. According to an embodiment of the present invention, the load distribution controller 1431 controls the measuring and collecting of load information associated with the BS, controls the exchange of load information with any adjacent BSs, controls the generation of any clusters including the BS, and controls the execution of any load distribution operations with respect to any cluster of which it is a member.

In addition, the load distribution controller 1431 controls the determination of subordinate relationships with any adjacent BSs, based on the load information that is exchanged with adjacent BSs. The load distribution controller 1431 controls the comparison of load information exchanged between the BSs, sets BS 1400 as a master BS when the load of BS 1400 is higher than the load of the adjacent BSs, and sets BS 1400 as a slave BS when the load of BS 1400 is lower than the load of the adjacent BSs.

In addition, the load distribution controller 1431 controls comparing load information of a BS included in a first cluster and load information of a BS included in a second cluster, sets a priority of a cluster including a cell having higher load information to be higher, and executes a load distribution operation, which will start from the cluster having the higher priority.

In addition, the load distribution controller 1431 controls updating load information with new load information based on a results of load distribution operations. When the BS 1400 has operated as a master BS while executing load distribution operations, the load distribution controller 1431 then terminates load distribution operations. When the BS 1400 is not a master BS while executing load distribution operations, the load distribution controller 1431 controls the forming of a cluster again based on a result of updating, and executes load distribution operations with respect to the newly formed cluster.

In addition, when the BS 1400 is a master BS in a cluster, the load distribution controller 1431 controls the distribution of the load of the master BS 1400 to any adjacent slave BSs. In particular, the load distribution controller 1431 sets a target load range, controls the transmission, to the slave BS, of information regarding users beyond the target load range, controls the reception, from the slave BS, of a response to the transmitted user information, and controls the updating of load information based on the received response.

In addition, the load distribution controller 1431 determines whether load distribution operations are completed in all of the generated clusters, and controls the execution of load distribution operations with respect to a user to which its cell actually provides service.

Although the above descriptions illustrate that the controller 1430 and the load distribution controller 1431 as separate blocks, it is for ease of description, and the configurations of a controller and a load distribution controller are not limited thereto. For example, the operations executed by the load distribution controller 1431 may be executed by the controller 1430.

Figure 15:
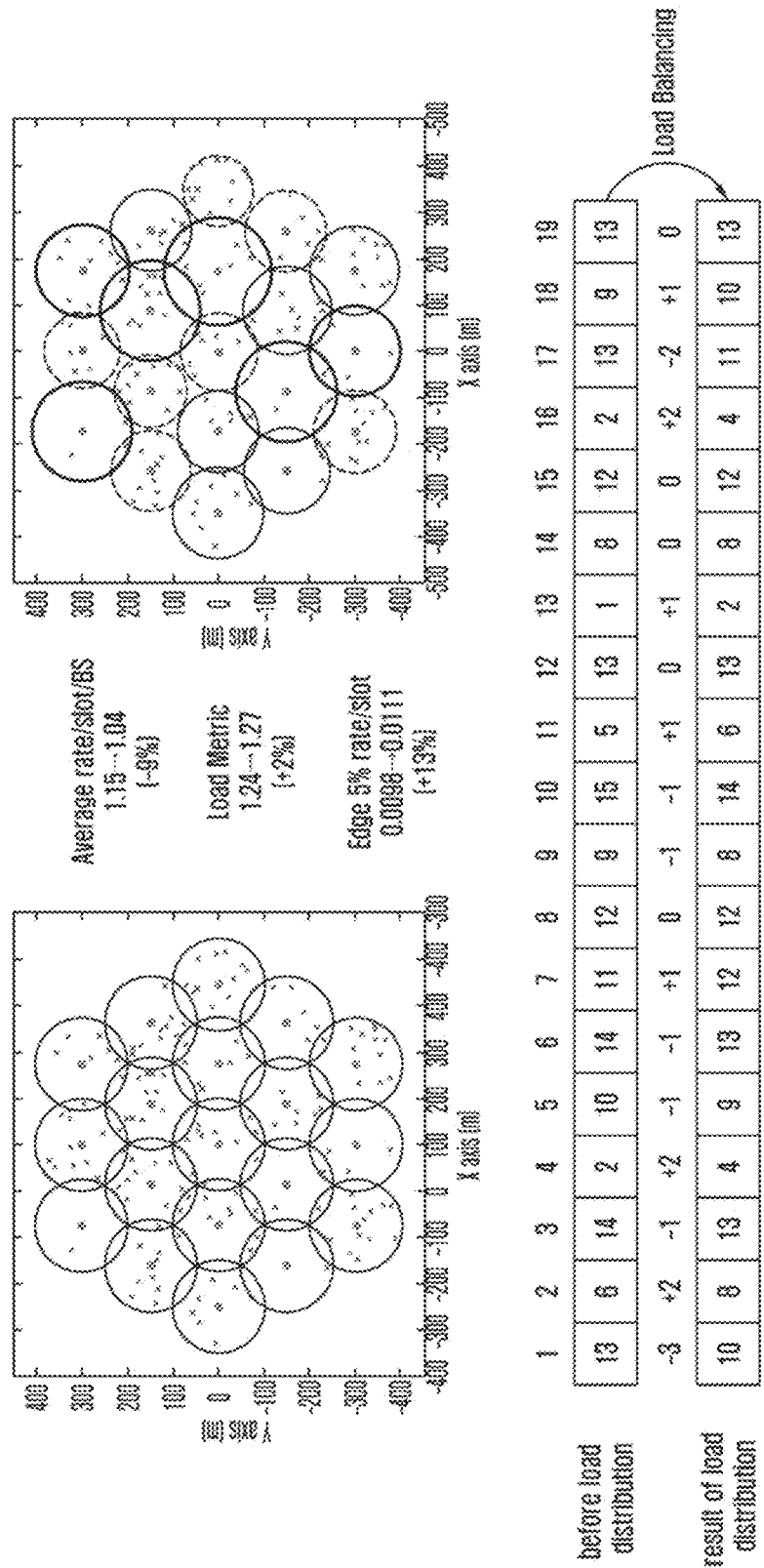
FIG. 15 is a diagram illustrating a first simulation result of the present invention.
Figure 16:
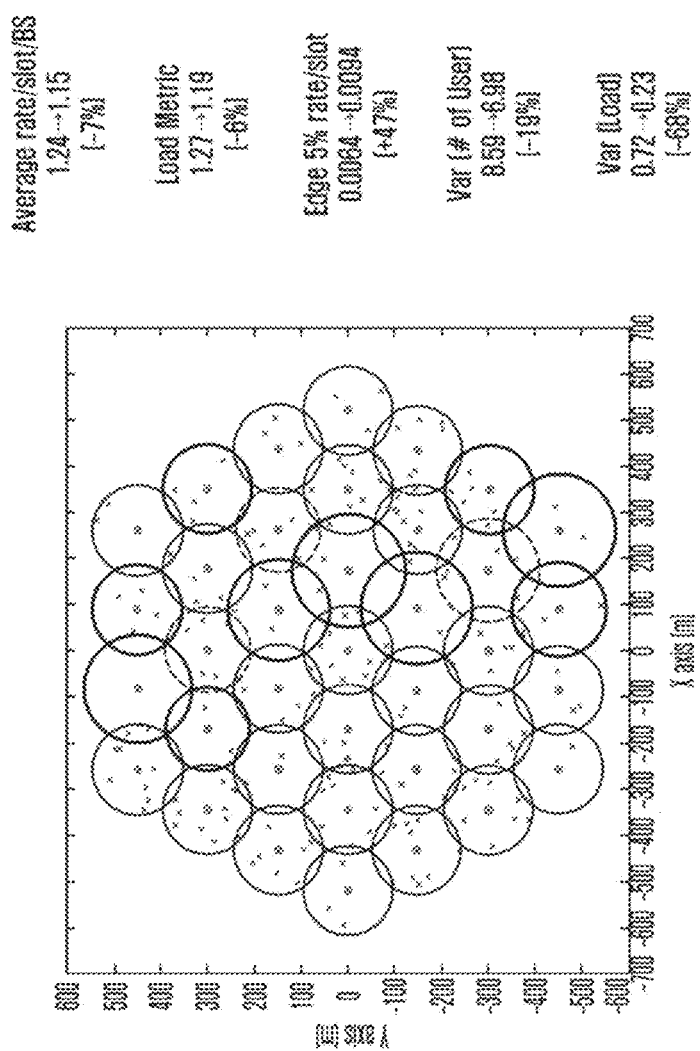
FIG. 16 is a diagram illustrating a second simulation result of the present invention.

Hereinafter, a simulation result according to an embodiment of the present invention will be described with reference to FIGS. 15 through 16. FIG. 15 is a diagram illustrating a first simulation result of the present invention, and FIG. 16 is a diagram illustrating a second simulation result of the present invention.

On the premise of a simulation, the simulation environment is assumed to be an environment where multiple cells are condensed in a Time Division Multiple Access (TDMA)-based cellular network. Each cell corresponds to a single antenna, cochannel interference exists among multiple cells, an X2-interfance is supported between adjacent BSs, and load information is broadcasted between adjacent BSs through the X2-interface.

The detailed simulation environment has the following simulation parameters.

| Table of Simulation Parameters | |
|---|---|
| Parameters | Assumptions |
| Inter-site Distance | 100 meters |
| Path Loss Exponent | 3.5 |
| Channel Model | Rayleigh fading |
| Log-normal Shadowing | Log-normal Fading with 8 dB Standard Deviation |
| White Noise Power Density | −174 dBm |
| Maximum BS TX Power | 24 dBm |
| Scheduling Algorithm | Proportional Fair Scheduling |
| Circuit Power | 10 W |

First Simulation

Referring to FIG. 15, the first simulation assumes 19 BSs and a 2-tier environment. The diagram on the left side illustrates a state in which actual users are distributed, and the diagram on the right side illustrates a state in which load distribution is executed according to an embodiment of the present invention. In each diagram, each circle indicates a cell corresponding to a BS. According to the simulation result, a cell marked by a dotted line is zoomed in by distributing a load to an adjacent cell, and a cell marked by a thick line is zoomed out by receiving a load from adjacent cells.

The simulation results in the change of the user distributions of each cell. For example, the number of users of cell 1 is changed from 13 to 10 after load distribution, and the number of users of cell 2 is changed from 6 to 8 after load distribution.

According to the analysis result, the average rate of the whole system is changed by −9%, from 1.15 to 1.04 after load distribution, and the load metric is changed by +2%, from 1.24 to 1.27 after load distribution. Edge 5% performance is increased by 13%, from 0.0098 to 0.0111, after load distribution.

Overall, the result of load distribution strictly executed based on an intermediate value of a load in the simulation environment shows that a load becomes uniform in the whole system, but the number of users who receive a service from a farther BS increases and an overall average rate of the system is decreased and the edge 5% performance is improved.

Second Simulation

Referring to FIG. 16, the second simulation assumes 37 BSs and a 3-tier environment. In each diagram, each circle indicates a cell corresponding to a BS. According to the simulation result, a cell marked by a dotted line is zoomed in by distributing a load to an adjacent cell, and a cell marked by a thick line is zoomed out by receiving a load from adjacent cells.

Similar to the first simulation of the 2-tier environment, the simulation results in load balancing through load distribution among all of the cells. The rate of the whole system is changed by −7% from 1.24 to 1.15 after load distribution, and the load metric is decreased by −6% from 1.27 to 1.19. Edge 5% performance of an edge user is increased by 47%, which is immensely improved.

In addition, a variance of the number of users per cell (VAR [# of User]) is decreased from 8.59 to 6.98 and thus, the distribution of the users per cell is more uniform than before the load distributing operations were executed. In addition, a variance value of the load of each cell (Var [Load]) is decreased from 0.72 to 0.23 and thus, the load value of each cell becomes similar to one another after the load distributing operation is executed.

Overall, according to the simulation results, in an embodiment of the present invention, a meager throughput loss (Average rate/slot/BS) generally occurs in the system but the change in load from the perspective of the whole system is not great and QoS of an edge user of a cell is significantly improved. In addition, users and loads are distributed to be uniform with respect to each cell and thus service is reliably provided in the whole system.

As described above, the load balancing method and apparatus of the present invention provides a method of executing load balancing even in a cluster border through dynamic clustering-based load balancing technology. In addition, through determination of the distribution-based load balancing, each cell reduces inter-cell traffic imbalance through the exchange of information with low complexity. Through the above, traffic balance and fairness of the whole system as opposed to a single cell is secured and thus, an inter-cell cooperation technology that reliably secures a minimum QoS of the whole system is provided.

In addition, the present invention provides a distribution-based dynamic load balancing technology through overlay clustering. The provided technology is designed so as to enable distributed cell load balancing without affecting the traffic service of the existing system. Through the above, a system may be designed that reliably manages fluid environments, such as environments where traffic is increased by newly generated users in each cell, and the like.

Although specific embodiments of the present invention have been described above, it will be apparent to those skilled in the art that the scope of the present invention is not limited to the above-described embodiments, and various modifications and modified forms may be made using the basic concept of the present invention without departing from the scope of the present invention.

What is claimed is:

1. A method for load distribution of a base station (BS), the method comprising:
measuring load information associated with a first BS;
transmitting the measured load information to at least one BS adjacent to the first BS;
receiving load information associated with the at least one BS adjacent to the first BS from the at least one BS adjacent to the first BS;
generating a first cluster including the first BS and the at least one BS adjacent to the first BS;
determining whether the first BS is a master BS in the first cluster and a slave BS in a second cluster; and
if the first BS is the master BS in the first cluster and the slave BS in the second cluster, executing a first load distribution operation for the first cluster based on the measured and received load information, and a distance between the first BS and each of the at least one BS adjacent to the first BS after a second load distribution operation for the second cluster is executed,
wherein the second cluster including a second BS and at least one BS adjacent to the second BS is generated by the second BS and the second BS is a master BS in the second cluster,
wherein a load of the second BS is greater than a load of the first BS, and
wherein the distance between the first BS and each of the at least one BS adjacent to the first BS is used to set a weight for a load that is distributed to each of the at least one BS adjacent to the first BS.

2. The method of claim 1, further comprising:
determining a subordinate relationship between the first BS and the at least one BS adjacent to the first BS based on the measured and received load information.

3. The method of claim 2, wherein determining the subordinate relationship comprises:
comparing the load information of the first BS with the load information of the at least one BS adjacent to the first BS; and
setting the first BS as a master BS when the load of the first BS is greater than the load of the at least one BS adjacent to the first BS and setting the first BS as a slave BS when the load of the first BS is less than the load of the at least one BS adjacent to the first BS.

4. The method of claim 2, wherein determining the subordinate relationship comprises:
comparing load information of a BS included in the first cluster and load information of a BS included in a cluster, and setting, to be higher, a priority of a cluster that includes a cell having a greater load.

5. The method of claim 4, further comprising:
executing the first load distribution operation for the first cluster after a load distribution operation for a cluster having a higher priority is performed.

6. The method of claim 1, further comprising:
updating load information with new load information based on a result of at least the load distribution operation.

7. The method of claim 6, further comprising:
forming a new cluster based on a result of updating; and
executing a load distribution operation with respect to the newly formed cluster.

8. The method of claim 1, wherein executing the first load distribution operation comprises:
when the first BS is the master BS in the first cluster, distributing a load of the master BS to an adjacent slave BS.

9. The method of claim 8, wherein distributing the load to the adjacent slave BS comprises:
setting a target load range of the first BS;
transmitting, to adjacent slave BS, information concerning any user that is beyond the target load range;
receiving, from the adjacent slave BS, a response to the transmitted user information; and
updating load information based on the received response.

10. The method of claim 1, further comprising:
determining whether load distribution operation is completed in all of the generated clusters; and
when the load distribution operation is completed in all of the clusters, executing a load distribution operation with respect to a user to which a cell of the BS actually provides service.

11. A base station (BS) that performs load distribution with any adjacent BSs, comprising:
a transceiver configured to perform data communication; and
a load distribution controller configured to:
measure load information associated with a first BS,
control transmission of the measured load information to at least one BS adjacent to first BS and reception of load information associated with the at least one BS adjacent to the first BS through the transceiver,
generate a first cluster including the first BS and the at least one BS adjacent to the first BS,
determine whether the first BS is a master BS in the first cluster and a slave BS in a second cluster, and
if the first BS is the master BS in the first cluster and the slave BS in the second cluster, execute of a first load distribution operation for the first cluster based on the measured and received load information and a distance between the first BS and each of the at least one BS adjacent to the first BS after a second load distribution operation for the second cluster is executed,
wherein the second cluster including a second BS and at least one BS adjacent to the second BS is generated by the second BS and the second BS is a master BS in the second cluster wherein a load of the second BS is greater than a load of the first BS, and wherein the distance between the first BS and each of the at least one BS adjacent to the first BS is used to set a weight for a load that is distributed to each of the at least one BS adjacent to the first BS.

12. The BS of claim 11, wherein the load distribution controller determines a subordinate relationship between the first BS and the at least one BS adjacent to the first BS based on the measured and received load information.

13. The BS of claim 12, wherein the load distribution controller controls comparing the load information transmitted and received between the at least one BS adjacent to the first BS and the first BS, sets the first BS as a master BS when the load of the first BS is greater than the load of the at least one BS adjacent to the first BS, and sets the first BS as a slave BS when the load of the first BS is less than the load of the at least one BS adjacent to the first BS.

14. The BS of claim 12, wherein the load distribution controller controls comparing load information of a BS included in the first cluster and load information of a BS included in a cluster, and sets, to be higher, a priority of a cluster that includes a cell having a higher load.

15. The BS of claim 14, wherein the load distribution controller controls the execution of the first load distribution operation for the first cluster after the execution of a load distribution operation for a cluster having a higher priority.

16. The BS of claim 11, wherein the load distribution controller controls updating the load information with new load information based on a result of the load distribution operation.

17. The BS of claim 16, wherein the load distribution controller controls:

forming a new cluster based on a result of updating and executing a load distribution operation with respect to the newly formed cluster.

18. The BS of claim 11, wherein the first BS is a master BS and load distribution controller controls load distribution from the master BS to the adjacent slave BS.

19. The BS of claim 18, wherein the load distribution controller sets a target load range of the first BS, controls transmission of information concerning a user that is beyond the target load range to adjacent slave BS, controls reception, from the adjacent slave BS, of a response to the transmitted user information, and controls updating load information based on the received response.

20. The BS of claim 11, wherein the load distribution controller determines whether load distribution operations are completed in all of the generated clusters, and, when the load distribution operations are completed in all of the clusters, controls a load distribution operation with respect to a user to which a cell of the BS actually provides service.

* * * * *